April 7, 1931.  E. F. BEUGLER  1,799,840
BARREL MAKING MACHINE
Filed March 18, 1929  3 Sheets-Sheet 1
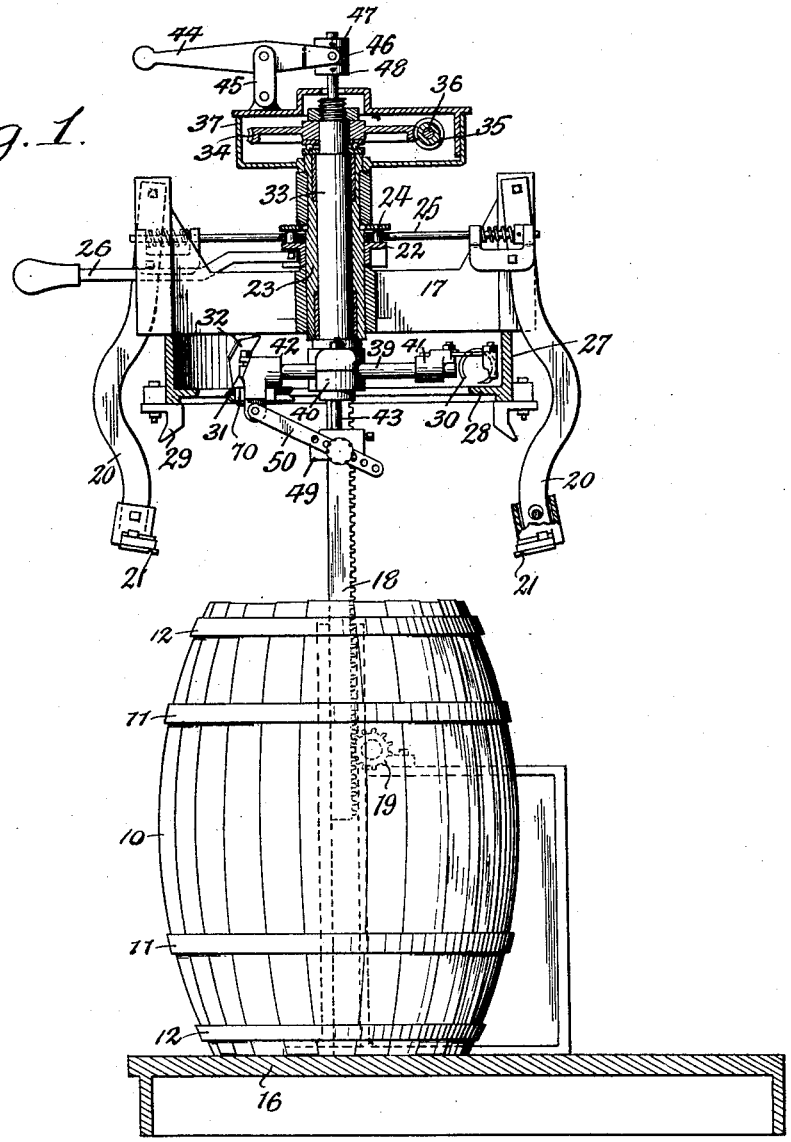

April 7, 1931.  E. F. BEUGLER  1,799,840
BARREL MAKING MACHINE
Filed March 18, 1929    3 Sheets-Sheet 2
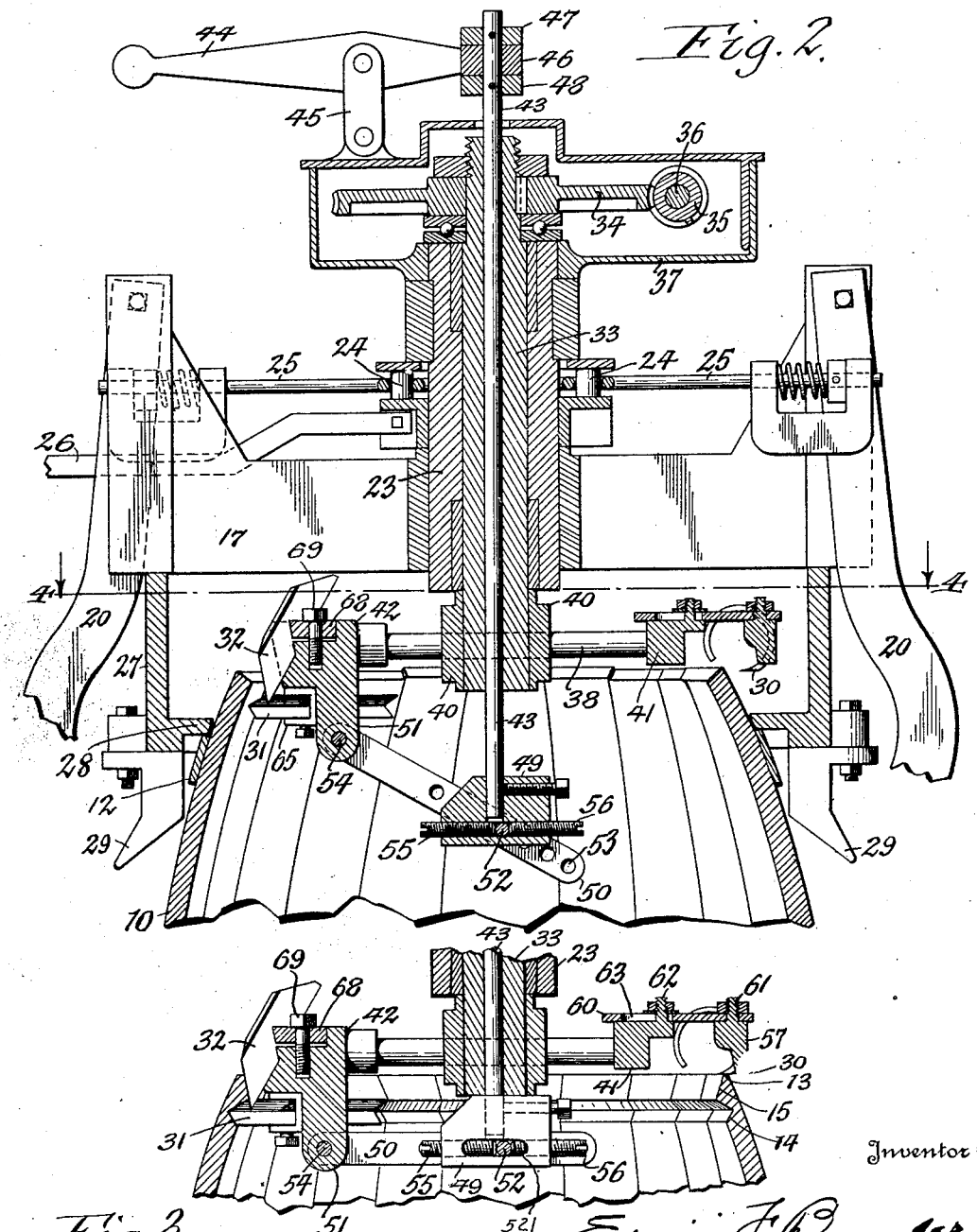

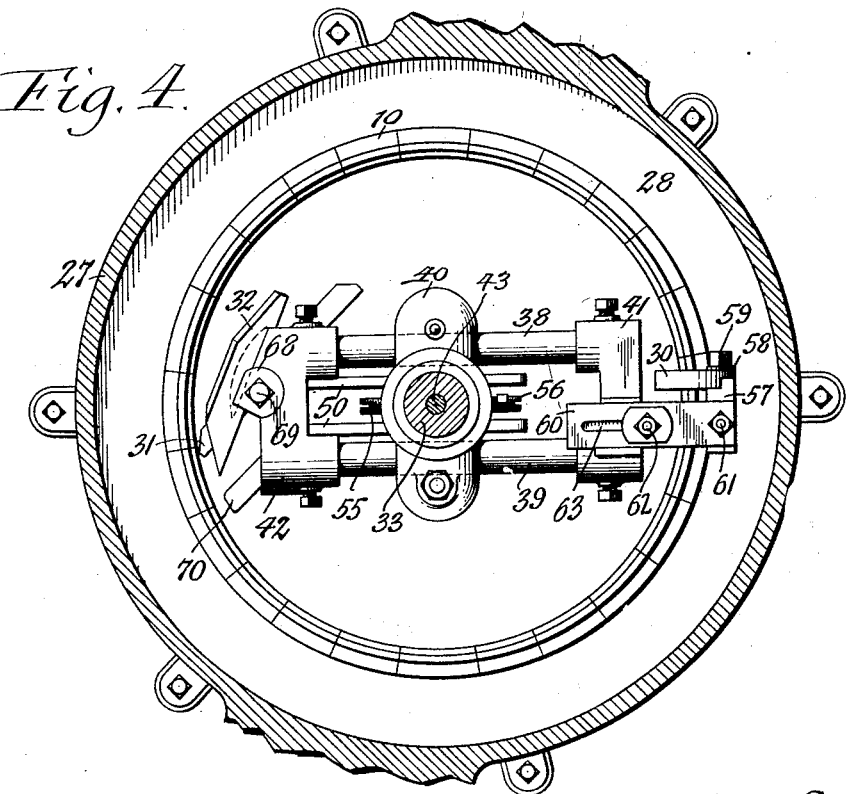
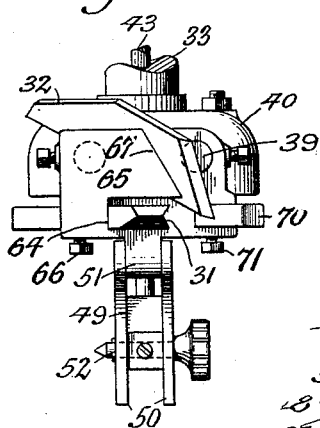
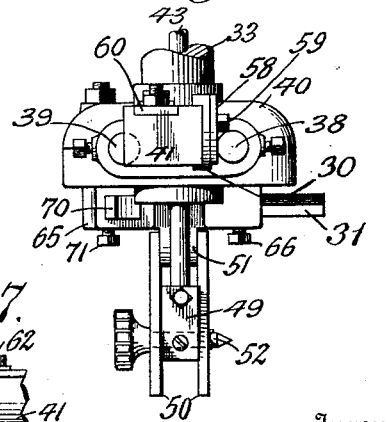
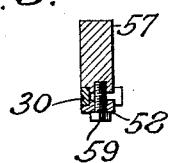

Patented Apr. 7, 1931

1,799,840

UNITED STATES PATENT OFFICE

EDWIN F. BEUGLER, OF BUFFALO, NEW YORK, ASSIGNOR TO E. & B. HOLMES MACHINERY CO. INC., OF BUFFALO, NEW YORK, A CORPORATION OF NEW YORK

BARREL-MAKING MACHINE

Application filed March 13, 1929. Serial No. 347,753.

This invention relates to a machine for making barrels of wooden staves, and more particularly to the cutting mechanism whereby the edge of the barrel at the end of the staves is trimmed off even, an annular internal croze is cut on the staves adjacent to the ends thereof for the reception of the edge of the barrel head, and an inclined face or chamfer is cut on the outer ends of these staves between the edge and the croze for the purpose of guiding the barrel head to the croze.

It is the object of this invention to provide a cutting mechanism for this purpose which is simple and compact, easily operable, and capable of being readily adjusted to permit of operating upon barrels of different diameters, and particularly adaptable for use where a limited amount of space is available.

In the accompanying drawings:

Figure 1 is a side elevation, partly in section, of a barrel making machine embodying this invention and showing the cutter mechanism elevated and in its inoperative position.

Figure 2 is a fragmentary vertical section, on an enlarged scale, of the cutter mechanism and associated parts, showing the same lowered upon the barrel and the cutter mechanism in its inoperative position.

Figure 3 is a similar view but showing the cutter mechanism in its operative position.

Figure 4 is a horizontal section taken on line 4—4 Fig. 2.

Figure 5 is an end elevation of the knife block of the cutter mechanism which supports the chamfer and croze cutter and adjacent parts.

Figure 6 is a similar view of the cutter mechanism showing an end elevation of the knife block which carries the end trimmer and adjacent parts.

Figure 7 is a fragmentary side elevation of the knife block which carries the end trimmer and adjacent parts.

Figure 8 is a horizontal section taken on line 8—8 Fig. 7.

In the following description similar characters of reference indicate like parts in the several figures of the drawings.

The barrel which is adapted to be operated upon by the machine embodying the improved cutter mechanism may be of any suitable construction but as shown in the drawings the same is one of usual type and comprises a plurality of longitudinal staves 10 which taper toward opposite ends so that the barrel as a whole is wide or bilged at the center and narrower or of smaller diameter at opposite ends, bilge hoops 11 surrounding the assembled staves on opposite sides of the bilge of the barrel, and end hoops 12 surrounding the opposite ends of the staves adjacent to the extremities thereof.

In the finished condition of the barrel, as shown in Fig. 3, the opposite ends of the staves are trimmed off, as shown at 13, so that the edges of the barrel are uniform and even, an internal croze or channel 14 is formed circumferentially within the staves at each end thereof for the reception of the barrel head which is adapted to close the respective end of the barrel, and an outwardly flaring surface or chamfer 15 is formed internally on the staves between the outer trimmed edge 13 and the croze 14 for the purpose of guiding the barrel head inwardly to the croze during the assembly of the same.

The general organization of the barrel making machine in which this cutting mechanism is incorporated comprises a platform 16 upon which the barrel to be operated upon rests at its lower end, a vertically movable carrier 17 arranged above the platform adjacent to the upper end of the barrel, means for raising and lowering this carrier consisting generally of an upright gear rack 18 arranged on each side of the barrel station and connected at its upper end with the carrier 17 and guided at its lower end on the platform, and a rotary gear pinion 19 mounted on the platform and meshing with the gear rack.

Upon the carrier or cross head 17 is mounted the mechanism whereby the bilge hoops are driven on the barrel, which driving mechanism consists of a plurality of driving arms 20 pivoted at their upper ends on the cross head or carrier 17 so as to be capable of swinging toward and from the axis of the barrel, driving jaws 21 arranged at the lower ends of these driving arms and adapted to be moved into and out of line with the position of the bilge hoop on the barrel, and means for moving these jaws into and out of their operative position comprising a crank disk 22 journaled on the exterior of an upwardly projecting bearing sleeve 23 on the central part of the carrier 17 and having a plurality of cranks 24 which are operatively connected by means of rods 25 with the upper parts of the driving arms, and a handle 26 connected with the crank disk 22 and permitting of turning this crank disk so as to draw the driving arms inwardly into their operative position relatively to the barrel, or moving them outwardly into their inoperative position relative to the bilge hoops on the barrel.

This bilge hoop driving mechanism is operated before effecting the driving of the end hoops or performing the end trimming, croze cutting and chamfer cutting operations on the respective end of the barrel, and this is accomplished by moving the driving arms inwardly into their operative position relative to the bilge hoops while the carrier is in its elevated position, after which the carrier is lowered and the driving jaws 21 will engage the bilge hoop and drive the same onto the bilge of the barrel.

Thereafter the carrier is again raised, the driving jaws are moved outwardly into their inoperative position and the carrier is again lowered for the purpose of driving the end hoop onto the staves, this being accomplished by means of a driving ring 27 mounted on the underside of the carrier 17 and provided with a driving flange 28 which projects inwardly and is adapted in the lowered position of the carrier to engage with the respective end hoop 12 and drive the same tightly onto the staves of the barrel, as shown in Fig. 2.

In order to center the barrel properly with reference to this end driving ring and also relative to the cutter mechanism which subsequently operates thereon for trimming the ends of the staves, forming the croze therein and also the chamfer thereon, guiding fingers 29 are provided having inclined surfaces which are adapted to engage with the exterior of the barrel immediately below the end hoop 12, as shown in Fig. 2.

The cutter mechanism which embodies my invention and which is designed to perform the operations of trimming the end of the barrel and forming the croze and chamfer thereon may be varied somewhat so far as its details of construction are concerned, but in the preferred form the same, as shown in the drawings, is constructed as follows:—

The numeral 30 represents the trimming cutter or knife which in its preferred form is of crescent or C shape in order to permit the same to be made of sufficient length so that it can be placed in a narrow space and still provide adequate length which will enable the same to be advanced when necessary as its front or cutting edge becomes worn and requires sharpening. The numeral 31 represents the croze cutter, knife or blade whereby the croze is cut circumferentially on the inner side of the barrel staves adjacent to the ends thereof and which preferably has the form of a V-shaped chisel which is straight but of such length that its front or cutting edge may be repeatedly sharpened to compensate for wear thereon. The numeral 32 represents the chamfer cutting blade or knife which preferably has the form of a flat blade with its cutting edge at the front end thereof and also of sufficient length to permit of adjusting the same to take up wear as the same is repeatedly sharpened when worn.

The mechanism whereby these several knives, cutters or blades are operated, is so organized that when these blades are in their inoperative position the edge trimming knife 30 is arranged outside of the periphery of the assembled barrel staves, and the croze and chamfer cutting knives or blades are arranged inwardly from the bore of the barrel, but in operating the machine to perform the trimming, crozing and chamfering operations, the trimming knife is moved inwardly across the end of the staves, the croze cutter is moved outwardly so as to engage the bore of the barrel adjacent to the end thereof, and the chamfering knife is also moved outwardly into engagement with that portion of the barrel staves between the respective croze and the outer ends of the staves. A rotary movement is imparted to these cutter blades or knives so that when the same are moved into their operative position relative to the staves they will form the above described trimming, crozing and chamfering operations thereon.

The means whereby the several knives or blades are thus shifted into or out of their operative position and also rotated are constructed as follows:—

The numeral 33 represents an upright hollow shaft journaled in the bearing 23 and rotated by means of a worm wheel 34 secured to the upper end of this shaft, a worm 35 meshing with the worm wheel 34, and a driving shaft 36 which carries the worm 35 and receives its power from any suitable source, and which is journaled in suitable bearings formed on the housing 37 mounted on the upper end of the bearing 23 so as to rise and fall with the yoke or carrier 17.

Mounted on the lower end of the shaft 33 so as to rotate therewith is a horizontally movable slide upon which the several cutters or blades are mounted, which slide in its preferred form comprises two horizontal parallel slide rods 38, 39 which are arranged on opposite sides of the axis of the shaft 23 and are slidably mounted in opposite ends of a cross head 40 mounted on the lower end of the shaft 23, a cross bar 41 connecting one of the corresponding pairs of ends of the slide rods 38, 39, and another cross bar 42 connecting the opposite corresponding ends of these slide rods, as best shown in Figs. 4, 5 and 6. A horizontal movement is imparted to this slide parallel with a radial line drawn relative to the axis of rotation of the shaft 23, this being preferably accomplished by means of a vertically movable shifting rod 43 slidable within the hollow shaft 33, a hand operated rock lever 44 movably connected by means of a link 45 with the upper side of the casing 37 and also connected with the upper end of the shifting rod 43 so that the latter is free to turn independently of the lever 44 but is compelled to move vertically therewith, this being preferably accomplished by means of a swivel collar 46 arranged upon the rod 43 and pivoted to the inner arm of the lever 44, and stop collars 47, 48 arranged on the rod 43 above and below the swivel collar 46.

The lower end of the shifting rod 43 is operatively connected with the knife carrying slide by a linkage consisting preferably of a shifting block 49 secured to the lower end of this shifting rod 43, and two links 50 arranged on opposite sides of the block 49 and a lug 51 projecting downwardly from the cross bar 42, a pivot pin 52 extending transversely through the shifting block 49 and through one or another of a longitudinal series of openings 53 in the inner ends of the links 50, and a pivot pin 54 passing transversely through the pivot lug 51 and the outer ends of the links 50, as shown in Figs. 1–6.

The position of the slide relative to the shifting block 49 may be roughly adjusted by engaging the pivot pin 52 with that pair of openings 53 in the links which are such a distance from the pivot pin 54 as will approximate the required throw of these links to bring the cutter blades in their proper position when operating the machine, but the fine adjustment for accurately adjusting the throw of the slide in order to bring the cutters exactly to the right position for performing their cutting operation on the barrel is effected by means of two adjusting screws 55, 56 which work in threaded openings on opposite sides of the shifting block 49 and engage with opposite sides of the pivot pin 52, as shown in Fig. 2.

The pivot pin 52 extends across a horizontal slot 521 in the lower part of the block 49, as shown in Fig. 3.

By slackening on one of these adjusting screws and tightening the other the pivot pin 52 may be moved transversely on the shifting block 49 so that the pivotal connection between the links 50 and the lower end of the shifting rod 43 will be accurately located to suit the requirements of the cutting operation.

The trimming cutter 30 is capable of being adjusted for the purpose of taking up wear by securing the same to a knife block 57 and a clamping block 58 between which a portion of this trimming cutter 30 is secured by connecting this knife block and the clamping block by means of a screw 59, as best shown in Figs. 4, 6, 7 and 8. As the front end of this trimming knife becomes dull and taking up on the same becomes necessary due to sharpening of its cutting edge, the screw 59 is loosened thereby permitting the trimming knife to be turned upon its axis so as to advance its cutting edge the required extent for bringing the same to the proper cutting line on the end of the barrel, and then this knife is again held in position by tightening of this bolt 59.

Bodily adjustment of the trimming cutter relative to the slide is effected by means of an adjusting bar 60, the outer end of which is detachably connected with the upper side of the cutter block 57 by means of a bolt 61 passing through an opening in the respective end of the adjusting bar and forming part of the cutter block 57, and a bolt 62 projecting upwardly from the cross bar 41 and through a longitudinal slot 63 in the inner end portion of the adjusting bar 60 so that upon loosening the bolt 62 the adjusting bar may be moved radially inward or outward the required extent for bringing the front or cutting edge of the cutters 30 into the desired position relative to the edge of the barrel after which the parts are maintained in this relative position by tightening of said bolt 62.

The croze cutter, knife or blade 31 is arranged obliquely with reference to a radial line within an opening 64 in the lower part of a knife block 65 formed on the outer part of the cross bar 42, said croze cutter being capable of adjustment in said opening 64 by means of a set screw 66.

The chamfering knife, blade or cutter 32 is obliquely mounted on the slide so that the same can be properly adjusted relative to the end of the barrel and also permit of taking up wear due to sharpening, by engaging the lower part of this knife within an upwardly opening seat having a fixed outer wall 67 engaging with the outer side of the blade 32 formed by the adjacent part of the cutter block 65, and a clamping block 68 engaging with the inner side of this blade 32 and connected with the adjacent part of the knife block 65 by means of a clamping screw 69, as best shown in Figs. 2, 3, 4 and 5.

When a fresh barrel is to be introduced into the machine or a finished barrel is removed therefrom, the carrier 17 is in its elevated position and the cutter mechanism mounted on the carrier is retracted into its inoperative position, as shown in Fig. 1. After a barrel has been placed upon the platform 16 and the operation of driving the bilge hoops thereon has been completed, the carrier is lowered so as to bring the flange 28 of the driving ring against the upper end hoop 12 and drive the latter downwardly and at the same time lower the cutter mechanism into its proper position preparatory to beginning its cutting operation on the upper end of the barrel, as shown in Fig. 2.

After the cutter mechanism has been thus lowered relative to the upper end of the barrel, the operator manipulates the parts which will cause the cutting mechanism to rotate and then depresses the outer arm of the hand lever 44, whereby the inner ends of the links 50 of the linkage will be raised and cause the slide carrying the cutter to move radially relative to the axis of rotation of the shaft 23. When this occurs the cutting edge of the end trimming blade or knife 30 will be carried inwardly across the outer end of the barrel and operate to remove the same uniformly and evenly, the crozing knife 31 will be engaged with the inner side of the barrel to form the croze or groove 14 therein for the reception of the barrel head, and the chamfer blade 32 will be engaged with that portion of the staves between the croze 14 and the edge of the barrel so as to form the chamfer 15 thereon.

After the cutting operation of these several blades on the barrel has been completed, the operator raises the outer arm of the hand lever 44, thereby causing the inner ends of the links 50 to be lowered and the cutter carrying slide to be moved radially into its retracted position in which the trimming knife 30 is again moved outwardly beyond the periphery of the barrel and the croze cutter 31 and the chamfering knife 32 are moved inwardly away from the inner side of the barrel, as shown in Fig. 2.

Thereafter the carrier 17 is again lifted together with the parts of the cutter mechanism, which latter at this time are free of the barrel in order to partake of this movement, thereby completing the cycle of operations.

In order to prevent the croze cutter and the chamfer cutter from digging into the wood of the staves in a manner which is commonly known as "hogging" a stop 70 is provided which latter is preferably in the form of a bar adjustably secured by means of a set screw 71 in an opening of the lower part of the cutter block 65, so that the front end of this "hogging" bar may be so adjusted that the same will engage with the surface of the barrel when the crozing and chamfering cutters have cut the required depth into the barrel staves, and thereby serve as a stop which will prevent this depth from being exceeded.

As a whole this cutter mechanism is comparatively simple and compact in construction so that the same is particularly suited for use where a limited amount of space is available, the same can be very readily operated by a minimum amount of power, and the same can be readily adjusted to suit different sizes of barrels, and also to adapt the machine for performing the cutting operation efficiently and accurately.

I claim as my invention:—

1. A barrel making machine comprising a rotary shaft, a slide guided on said shaft to move radially relatively thereto, a knife mounted on said slide and adapted to engage a barrel and means for shifting said slide comprising a shifting rod movable lengthwise in said shaft, a shifting block arranged on said rod and provided with a horizontal slot, a pair of links connected at one end with said slide, a pivot pin extending through the slot in said block and said links, and adjusting screws arranged on said block and engaging with opposite sides of said pivot pin.

2. A barrel making machine comprising a rotary shaft, a slide guided on said shaft to move radially relatively thereto, a knife mounted on said slide and adapted to engage a barrel, and means for shifting said slide comprising a shifting rod movable lengthwise in said shaft, a shifting block arranged on said rod and provided with a horizontal slot, a pair of links connected at one end with said slide, a pivot pin extending through the slot in said block and said links, and adjusting screws arranged on said block and engaging with opposite sides of said pivot pin, said links being provided with rows of openings of which different corresponding ones are adapted to receive said pivot pin.

In testimony whereof, I hereby affix my signature.

EDWIN F. BEUGLER.